US009088313B2

(12) United States Patent
Campos et al.

(10) Patent No.: US 9,088,313 B2
(45) Date of Patent: Jul. 21, 2015

(54) MULTIPLE-INPUT MULTIPLE-OUTPUT (MIMO) COMMUNICATION SYSTEM

(71) Applicant: Cable Television Laboratories, Inc., Louisville, CO (US)

(72) Inventors: Luis Alberto Campos, Superior, CO (US); Jennifer Andreoli-Fang, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 112 days.

(21) Appl. No.: 13/769,288

(22) Filed: Feb. 16, 2013

(65) Prior Publication Data

US 2014/0321565 A1  Oct. 30, 2014

(51) Int. Cl.
*H04B 7/02* (2006.01)
*H04B 7/04* (2006.01)

(52) U.S. Cl.
CPC .................................. *H04B 7/0413* (2013.01)

(58) Field of Classification Search
USPC ......... 375/295, 316, 219, 220, 222, 288, 259, 375/260, 267, 299, 347, 349
See application file for complete search history.

(56) References Cited

U.S. PATENT DOCUMENTS

| | | | |
|---|---|---|---|
| 5,185,763 A | | 2/1993 | Krishnan |
| 5,504,783 A | * | 4/1996 | Tomisato et al. ............. 375/267 |
| 5,561,686 A | * | 10/1996 | Kobayashi et al. ........... 375/134 |
| 5,749,857 A | * | 5/1998 | Cuppy ..................... 604/164.12 |
| 6,941,079 B1 | | 9/2005 | Barozzi |
| 6,944,120 B2 | * | 9/2005 | Wu et al. ...................... 370/208 |
| 7,391,832 B2 | | 6/2008 | Catreux-Erces et al. |
| 8,223,872 B1 | | 7/2012 | Zhang |
| 2002/0122398 A1 | * | 9/2002 | Jou ............................... 370/335 |
| 2002/0126338 A1 | * | 9/2002 | Volpi et al. ................... 359/110 |
| 2004/0037565 A1 | * | 2/2004 | Young et al. .................. 398/115 |
| 2005/0063340 A1 | | 3/2005 | Hoffmann |
| 2005/0105632 A1 | | 5/2005 | Catreux-Erces et al. |
| 2005/0174935 A1 | | 8/2005 | Segel |
| 2006/0234663 A1 | | 10/2006 | Wilhoyte |
| 2007/0032220 A1 | | 2/2007 | Feher |
| 2007/0054625 A1 | | 3/2007 | Beale |
| 2009/0028192 A1 | | 1/2009 | Rieger |
| 2009/0204877 A1 | | 8/2009 | Betts |
| 2010/0035600 A1 | * | 2/2010 | Hou et al. .................. 455/422.1 |
| 2011/0019723 A1 | | 1/2011 | Lerner |
| 2011/0080979 A1 | * | 4/2011 | Duggan ....................... 375/340 |

(Continued)

FOREIGN PATENT DOCUMENTS

| | | |
|---|---|---|
| WO | 2005/062498 | 7/2005 |
| WO | 2011/161637 | 12/2011 |

OTHER PUBLICATIONS

WO/2005/062498 A1 published on Jul. 7, 2005 by Catreux Erceg.*

(Continued)

*Primary Examiner* — Siu Lee
(74) *Attorney, Agent, or Firm* — Great Lakes Intellectual Property, PLLC

(57) ABSTRACT

A multiple-input multiple-output (MIMO) capable system is contemplated. The communication system may include a signal processor configured to separate an input stream into multiple signal paths to facilitate simultaneous transport through a communication medium. The capability to simultaneously transmit multiples signal paths may be beneficial in order to maximize throughput and/or minimize expense.

17 Claims, 5 Drawing Sheets

(56) References Cited

U.S. PATENT DOCUMENTS

| | | |
|---|---|---|
| 2011/0243025 A1 | 10/2011 | Kim |
| 2012/0206285 A1 | 8/2012 | Khlat |
| 2012/0236971 A1 | 9/2012 | Taghavi Nasrabadi et al. |
| 2012/0281621 A1 | 11/2012 | Lotfallah |
| 2012/0331111 A1 | 12/2012 | Wu et al. |
| 2013/0016966 A1* | 1/2013 | Jansen et al. .............. 398/25 |
| 2013/0076566 A1 | 3/2013 | Jiang et al. |
| 2013/0201316 A1 | 8/2013 | Binder et al. |
| 2013/0215833 A1 | 8/2013 | Ong et al. |
| 2013/0216228 A1 | 8/2013 | Nazarathy et al. |
| 2013/0308950 A1* | 11/2013 | Blouza et al. .............. 398/79 |
| 2014/0066098 A1 | 3/2014 | Stern et al. |
| 2014/0177745 A1 | 6/2014 | Krishnamurthy et al. |
| 2014/0206367 A1 | 7/2014 | Agee et al. |
| 2014/0219267 A1 | 8/2014 | Eyuboglu et al. |
| 2014/0233678 A1* | 8/2014 | Campos et al. .............. 375/299 |
| 2014/0241446 A1 | 8/2014 | Zhang et al. |
| 2014/0270776 A1* | 9/2014 | Jinno et al. .............. 398/69 |
| 2014/0294393 A1* | 10/2014 | Lowery et al. .............. 398/76 |
| 2014/0302802 A1 | 10/2014 | Chang et al. |
| 2014/0321565 A1 | 10/2014 | Campos et al. |
| 2014/0342659 A1 | 11/2014 | Maharajh et al. |

OTHER PUBLICATIONS

PCT/AU2012/000209, published on Sep. 7, 2012.*
International Search Report (ISR) and Written Opinion of corresponding PCT application, Aug. 28, 2014.

* cited by examiner

MULTIPLE-INPUT MULTIPLE-OUTPUT (MIMO) COMMUNICATION SYSTEM

TECHNICAL FIELD

The present invention relates to communication systems and signal processors, such as but not necessarily limited to those capable of facilitating multiple-input multiple-output (MIMO) communications.

BACKGROUND

Wireless communications systems may employ multiple-input multiple-output (MIMO) techniques to facilitate multi-path communications. The multipath capabilities of MIMO systems allow data to be transmitted simultaneously over multiple paths between a plurality of transmitting antennas and a plurality of receiving antennas to effectively increase capacity over single path systems.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
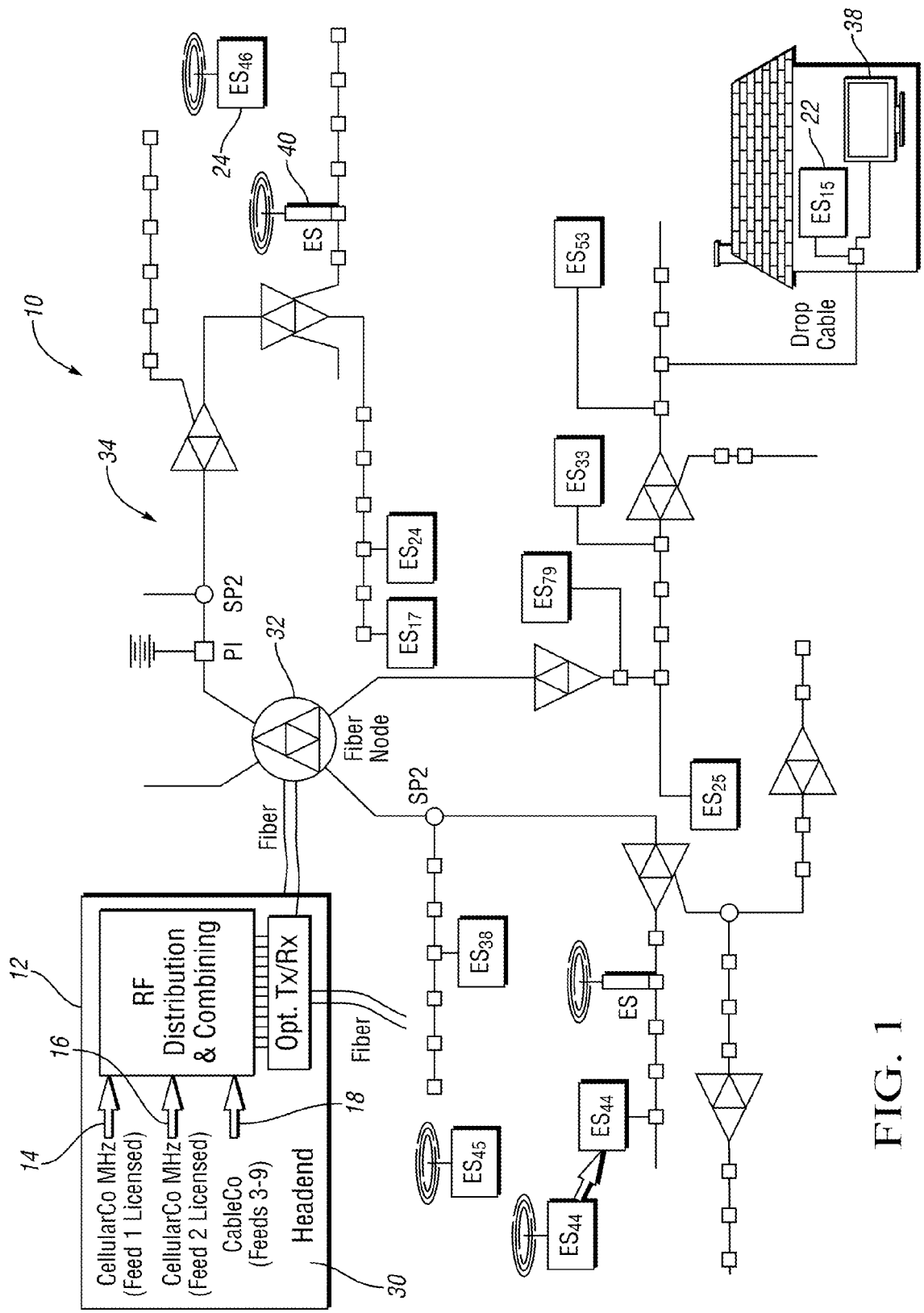
FIG. 1 illustrates a multiple-input multiple-output (MIMO) communication system in accordance with one non-limiting aspect of the present invention.

FIG. 1 illustrates a multiple input multiple output (MIMO) communication system 10 in accordance with one non-limiting aspect of the present invention. The system 10 may be configured to facilitate electronic signaling between a signal processor 12 and one or more end stations (ES) terminals or other devices. The signal processor 12 may be configured to facilitate transport of virtually any type of signaling, including signaling associated with a multiple system operator (MSO), such as but not necessarily limited to a cable, satellite, or broadcast television service provider, a cellular service provider, and high-speed data service provider, an Internet service provider (ISP), etc. The communication system 10 is illustrated with respect to the signal processor 12 supporting a first feed 14, a second feed 16, a third feed 18 (representing seven independent feeds), although more or less feeds may be received for transport. Each feed 14, 16, 18 may include data communicated to the signal processor 12 from a local or remote sourcing device/entity. The first and second feeds 14, 16 may be associated with cellular related signaling (e.g., signaling associated with cellular phone call) and the third feed 18 may be associated with cable related signaling (e.g., signaling associated with delivery of a television program and/or Internet data download).

The end stations ES may correspond with any electronically operable device having capabilities sufficient to facilitate directly or indirectly interfacing a user with signaling transported through the communication system. The end stations ES may be a gateway, a router, a computer, a mobile phone, a cellular phone, a media terminal adapter (MTA), a voice over Internet protocol (VoIP) enable device, a television, a set top box (STB), network address translator (NAT), etc. For exemplary non-limiting purposes, a first end station 22 is shown to be a wireline type of device, such as a home gateway or set-top box configured to output signaling to a television, and a second end station 24 is shown to be a wireless type of device, such as a wireless computer, television, cellular phone. The use of such first and second end stations 22, 24 may be beneficial in facilitating continued access to a television program while a user travels between locations associated with the first and second ends stations 22, 24. Seamless access to the content may be provided in this manner using different ends stations or capabilities of the end stations, e.g., a wireless capability of the second end station 24 may be used when at one location and a wireline capability of the first end station 22 may be used when at another location.

The present invention contemplates distinguishing between wireless and wireline communications. The wireline communications may correspond with any type of electronic signal exchange where a wire, a coaxial cable, a fiber or other bound medium is used to facilitate or otherwise direct at least a portion of the related signaling, including the signaling exchanged outside of the communicating device/processor. The wireline communications include but are not necessarily limited to those carried at least partially a fiber/cable backbone associated with a cable television distribution system or an Internet or non-Internet base data communication system. The wireless communications may correspond with any type of electronic signal exchange where an antenna or other transmitting type of device is used to communicate at least a portion of the signaling as radio frequency (RF) signals, such as over a wireless link or through an unbound or air medium. The wireless communications include but are not necessary limited to satellite communications, cellular communications, and Wi-Fi communications. The use of wireline and wireless communications and the corresponding mediums are not intended to limit the present invention to any particular type of medium, protocol, or standard and is instead noted to differentiate between two types of communications, i.e., bound and unbound.

The signaling desired for transports through the communication system 10 may be received at a headend unit 30 associated with the signal processor 12 and thereafter carried by one or more fibers to a fiber node 32. The fiber node 32 may be part of a cable television distribution system 34 from which a plurality of coaxial cables may facilitate further delivery to different geographical areas, optionally with use of splitters and/or amplifiers. The coaxial cables are shown to include a plurality of taps (shown as rectangles) through which various end stations may be connected to receive the wireline signaling and/or other signaling associated with the headend, e.g., signaling associated with other types of content and/or data transmissions. The first end station 22 is shown to be connected to one of the taps to facilitate output transported signals to a locally connected, first user equipment (UE) 38. The first end station 22 may be configured to facilitate processing of frequency diverse signals for wireline and/or wireless communication to the UE 38, which is shown to be a television but could be any other type of device. The first end station 22 may be configured to facilitate interfacing transported signals with the first UE 38 by converting frequency diverse signaling to an output signaling stream usable by the UE 38.

A third end station 40 is shown to be configured to facilitate wirelessly signaling with the second end station 24. The third end station 40 may be configured to convert the frequency diverse signals carried over the wireline distribution system 34 to spatially diverse signals or other suitable types of RF signals. The third end station 40 may be included as part of a Wi-Fi access point, a router, cellular tower, base station, etc. The ability of the third end station 40 to output wireless signaling may be beneficial if licensing or other restrictions limit how the wireless signals can be transmitted from the third end station 40, e.g., frequency usage restrictions may prevent output of the frequency diverse signals carried over the distribution system 34 to the second end station 24 without being pre-processed by the third end station 40. The third end station 40 may be configured to pre-process the frequency diverse signals carried over the distribution system 34 to wireless signals having other frequency characteristics license for use with the second end station 24.

The third end station 40 may be configured to convert received wireline signaling to wireless signaling suitable to any restrictions associated with the second end station 24. The third end station 40 may be useful in allowing a user to access content through different types of devices and/or to facilitate use of other wireless transmission frequencies and communication mediums. The third end station 40 may be configured to facilitate output of spatially diverse signals according to frequency ranges allocated to an originator of the corresponding signaling stream. The second end station 24 may be a handset, mobile phone or other device having capabilities sufficient to process spatially diverse signaling, such as to facilitate interfacing a cellular phone call with the user (additional processing may be done at the second end station 24 to facilitate the phone call or other operation desired for the signaling stream).

Figure 2A:
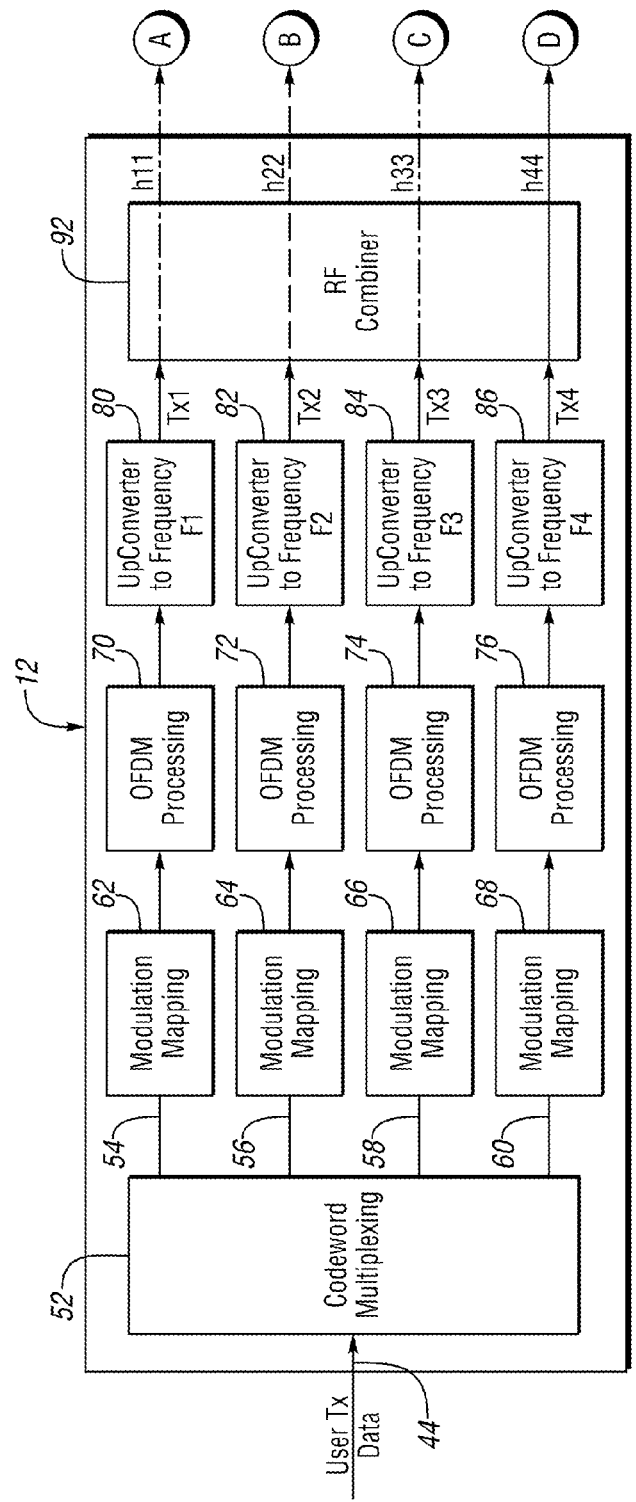
FIGS. 2a-2b schematically illustrate operation of the communication system when facilitating a wireline signaling mode in accordance with one non-limiting aspect of the present invention
Figure 2B:
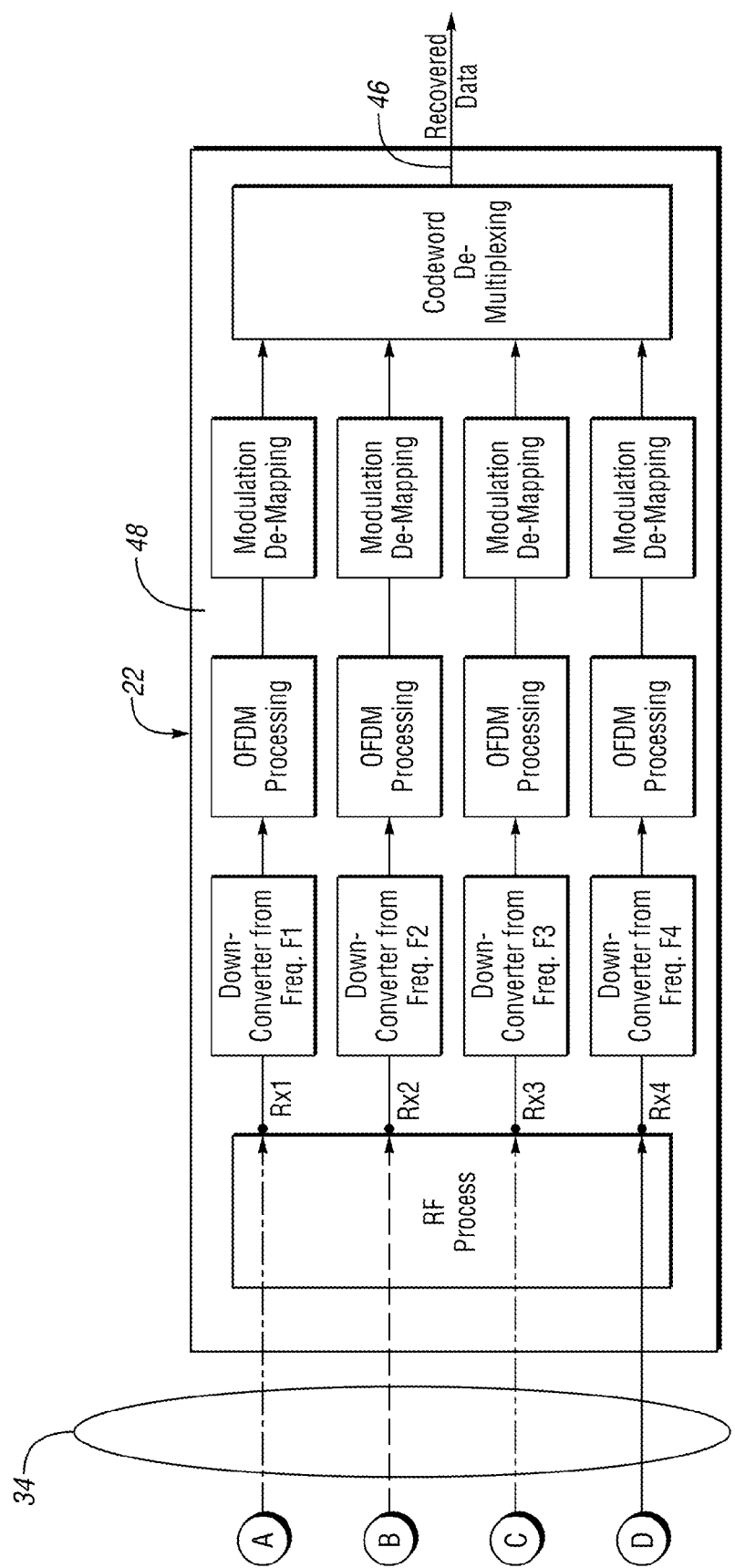

FIG. 2 schematically illustrates operation of the communication system 10 when facilitating wireline signaling mode in accordance with one non-limiting aspect of the present invention. The wireline signaling mode corresponds with the signal processor 12 receiving an input signal 44, processing the input signal for transmission over at least a portion of the wireline communication medium 34, and the first end station 22 processing the transmitted signaling into an output signal 46. The output signal 46 may be subsequently transmitted to the first UE 38 or other device for final use. The signal processor 12 may be configured to receive the input signal from a base station or other processing element desiring to transport signaling over the communication system (e.g., one of the feeds 14, 16, 18). The base station may be associated with an Internet service provider, a cable television sourcing entity, cellular phone provider or other source capable of providing data to the signal processor 12 for transport. The input signal 44 may be in the form of a baseband signal, a non-carrier wave (CW) type of signal and/or some other signaling/streaming sufficient to represent data, e.g. data represented using binary data bits/bytes and varying voltages or optical intensities. Optionally, the input signal 44 may be a non-diverse signal at least in that the data is carried within a single stream/signal as opposed to being divided for transmission using frequency diverse signaling and/or spatially diverse signaling.

The communication system 10 may be configured to facilitate transport of the input signal 44 (input data, message, video, audio, etc.) from an originating address associated with the sourcing entity to a destination address associated with the first UE 38 (or other end station). The present invention contemplates the signal processor 12 being configured to convert the input signal 44 to an intermediary signal prior to providing long-haul transport of the intermediary signal over one or more of the contemplated communication mediums so that the intermediary signal can be re-processed with another signal processor 48 of the second end station 24 that converts the intermediary signal to the output signal 46. In this manner, the output signal 46 may take the same form as the input signal 44 prior to being processed with the first signal processor 12. Optionally, the second signal processor 48 may be configured to generate the output signal 46 as a different type of signal, and in particular, such that the output signal 46 is a diverse signal having frequency and/or spatial diversity. The second signal processor 48 may be configured to assess the signaling capabilities of the first UE 38 and to adjust the characteristics of the output signal 46 to operate with the capabilities of the first UE 38.

The first signal processor 12 may include a codeword multiplexing device 52. The codeword multiplexing device 52 may be configured to multiplex the input signal 44 into a plurality of signal parts 54, 56, 58, 60. The codeword multiplexing device 52 is shown to be configured for non-limiting purposes to multiplex the input signal 44 into a first signal part 54, a second signal part 56, a third signal part 58 and a fourth signal part 60. The codeword multiplexer 52 may be configured to facilitate encoding the signal parts 54, 56, 58, 60 in/with codewords in order to enable additional robustness through addition of parity information. The codeword multiplexing device 52 may add extra bits to each signal part 54, 56, 58, 60 in case bits from one or more of the signaling parts 54, 56, 58, 60 are lost during communication. In a very benign environment, processing provided by the codeword multiplexing device 52 may be foregone, however, many applications, and in particular in MIMO, may practically require the additional robustness provided with the codewords. The use of four signal parts 54, 56, 58, 60 is believed to be beneficial as the particular implementation contemplates facilitating MIMO operations where the split parts correspond to four independent antenna ports. The codeword multiplexing device 52 may be configured to divide the input signal 44 into each of the signal parts 54, 56, 58, 60 such that each signal part 54, 56, 58, 60 carries at least a different portion of the input signal 44.

The signal processor 12 may include a plurality of modulation mapping devices 62, 64, 66, 68. The modulation mapping devices 62, 64, 66, 68 may be configured to format a received one of the first, second, third and fourth signal parts 54, 56, 58, 60 with respect to a constellation symbol. The mapping devices 62, 64, 66, 68, for example, may take a digital stream and convert that information into coordinate values defining different constellation symbols. The constellation symbol may correspond with a transport mechanism used within the communication system 10 to facilitate scheduling long-haul transmissions over the wireline communication 34, such as the constellation symbols associated with the MAP disclosed in U.S. patent application Ser. No. 12/954,079, the disclosure of which is hereby incorporated by reference in its entirety. In this manner, the modulation mapping devices 62, 64, 66, 68 may be configured to facilitate manipulating the data received from the codeword multiplexer 52 for actual transmission within the system 10. The modulation mapping devices 62, 64, 66, 68 may be configured to map or otherwise associate the bits/bytes output from the codeword multiplexer 52 with particular time periods and/or frequencies or other coordinates associated with transmission through the communication medium 34.

The signal processor 12 may include a plurality of orthogonal frequency division multiplexing (OFDM) processing devices 70, 72, 74, 76. The OFDM processing devices 70, 72, 74, 76 may be configured to facilitate transmission of the received one of the first, second, third and fourth signal parts 54, 56, 58, 60 over a plurality of subcarriers. The OFDM processing devices 70, 72, 74, 76 may be configured to facilitate transmitting each signal part 54, 56, 58, 60 using an independent one of multiple narrowband subcarriers. The constellation symbol resulting from the modulation mapping devices 62, 64, 66, 68 may be used define a plurality of values to which the particular subcarriers may be mapped. The use of multiple narrowband subcarriers may be beneficial in certain radio frequency environments compared to a single wideband carrier implementation. In principle, wideband carriers can also be used to carry frequency or spatially diverse information, however, the example of multiple narrowband subcarriers is used based on the likely environmental characteristics allowing it to provide better performance. The OFDM processing devices 70, 72, 74, 76 may be configured to translate a theoretical mapping provided by the modulation mapping devices 62, 64, 66, 68 for each signal part 54, 56, 58, 60 into actual signaling streams (spectrum) having specific parameters that will govern how the corresponding signals are actually transmitted beyond the signal processor 12. In this manner, the OFDM processing devices 70, 72, 74, 76 may be configured to map binary representations associated with the modulation mapping devices 62, 64, 66, 68 to the actual spectrum (e.g., signals received by the converter devices 80, 82, 84, 86).

The signal processor 12 may include a plurality of converter devices 80, 82, 84, 86. The converter devices 80, 82, 84, 86 may be configured to convert signaling associated with a received one of the first, second, third and fourth signal parts 54, 56, 58, 60 from a received frequency to a desired output frequency. The converter devices 80, 82, 84, 86 are shown to convert each of the first, second, third and fourth signal parts 54, 56, 58, 60 to a different frequency, which are correspondingly illustrated as a first frequency (F1), a second frequency (F2), a third frequency (F3) and a fourth frequency (F4). The conversion of each signal part 54, 56, 58, 60 output from the codeword multiplexing device 52 into a different frequency may be useful in providing frequency diversity. The frequency diversity may enhance throughput transmission of the input signal 44 at least in that frequency diversity may allow each signal part 54, 56, 58, 60 to essentially be carried through the communication system 34 simultaneously. The simultaneous transmission of multiple signal parts 54, 56, 58, 60 may allow more data to be transmitted than that which would be transmitted if the input signal 44 were not divided into multiple signal parts 54, 56, 58, 60 for transmission.

Figure 3:
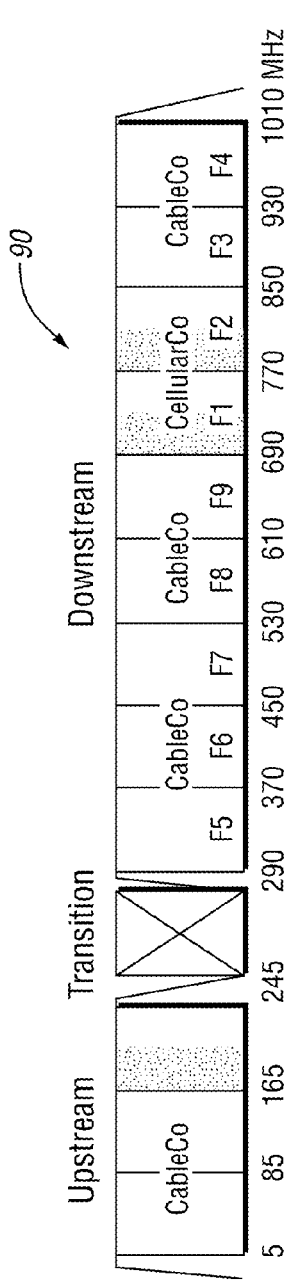
FIG. 3 illustrates a frequency selection map in accordance with one non-limiting aspect of the present invention.

FIG. 3 illustrates a frequency selection map 90 in accordance with one non-limiting aspect of the present invention. The frequency conversion map 90 may be used to facilitate selection of the frequency conversion performed with the signal processor converters 80, 82, 84, 86. The frequency selection map 90 may include a plurality of frequency intervals assigned to facilitate upstream and downstream transmissions within the communication medium 34. An additional interval of frequencies may be set aside as a transition boundary between upstream and downstream related frequencies in order to prevent fall off or other interferences between the upstream/downstream frequencies. The mapping table is shown to include a feed reference (F1, F2, F3, F4, F5, F6, F7, F8, and F9) within each one of the downstream intervals in order to illustrate certain frequency ranges set aside for particular feeds 14, 16, 18. One non-limiting configuration of the communication system 10 contemplates nine feeds being simultaneously transported downstream through the communication mediums without interfering with each other.

Each of the potentially supportable feeds 14, 16, 18 may be assigned to a particular one of the intervals depending on a mapping strategy, licensing strategy or other operational requirements. The frequencies of each feed 14, 16, 18 may be determined by an originator of the corresponding input signal 44. The signal processor 12 may identify the originator from additional information received with the corresponding input signal 44 in order to facilitate identifying which portion of the mapping table 90 has been allocated to support signal transmissions of that originator. A first interval of the downstream frequency spectrum ranging from 690-770 MHz has been allocated to support signaling associated with the originator of the first feed 14. A second interval the downstream frequency spectrum ranging from 770-850 MHz has been allocated support signaling associated with the originator of the second feed 16. The corresponding intervals of the downstream frequency spectrum allocated to the other feeds 18 as shown with reference to one of the illustrated F3, F4, F5, F6, F7, F8 and F9 designations.

When processing the first feed 14, the converter devices 80, 82, 84, 86 assigned to facilitate conversion of each corresponding signal part 54, 56, 58, 60 may be configured to select four different output frequencies from within the corresponding interval of the selection map, i.e., within 690-770 MHz. The particular frequency selected for each converter 80, 82, 84, 86 from within the 690-770 MHz interval may be determined in order to maximize a center frequency spacing, e.g., the first frequency (F1) may correspond with 710 Mhz, the second frequency (F2) may correspond with 730 MHz, the third frequency (F3) may correspond with 750 MHz and the fourth frequency (F4) may correspond with 770 MHz. The intervals in the selection map 90 may be tailored to the particular center frequency offset in order to facilitate desired frequency spacing, which for exemplary non-limiting purposes has been selected to correspond with 20 MHz. The signal processor 12 may include a separate set of devices to support simultaneous transmission of the second feed 16 whereby the corresponding converters may be configured to output the signal parts associated with the second feed at 790 MHz, 810 MHz, 830 MHz and 850 MHz. (The devices are used to support the additional feeds are not shown however they would duplicate the devices illustrated in FIG. 2 and additional duplicates may be included to support additional feeds.)

The signal processor 12 may include a combiner 92 configured to receive the signal parts 54, 56, 58, 60 from the converter devices 80, 82, 84, 86. The combiner 92 may be configured to correlate the received frequency diverse signals for transport over the communication medium 34. The combiner 92 may be configured to prepare the received first, second, third and forth signal parts 54, 56, 58, 60 for transmission to a laser transmitter (not shown) to facilitate subsequent modulation over an optical medium and/or for transmission directly to a hybrid fiber coaxial (HFC) or other wired communication medium 34. The communication medium 34 may be used to facilitate long-haul transport of the signal parts 54, 56, 58, 60 for subsequent receipt at the first end station 22. This type of long-haul transport of frequency diverse signaling, derive from processing the non-frequency diverse signaling received at the input 44 to the signal processor, may be helpful in maximizing signaling throughput.

The second signal processor 48 may include a processor, a plurality of down-converter devices, a plurality of OFDM processing devices, a plurality of modulation de-mapping devices and a codeword de-multiplexing device. These devices may be configured to facilitate inverse operations to those described above with respect to the signal processor 12 in order to facilitate generating the output signal 46. While the signal processors 12, 48 are described with respect to including various devices to facilitate the contemplated signal transmission, the signal processors 12, 48 may include other electronics, hardware, features, processors, or any other sufficient type of infrastructure having capabilities sufficient to achieve the contemplated signal manipulation. The first end station 22, in particular, may include an output port or other interface to facilitate communication of the output signal 46 to the first UE 38. In this manner, the communication system 10 may be configured to facilitate wireline signaling between the signal processor 12 and the first end station 22.

Figure 4A:
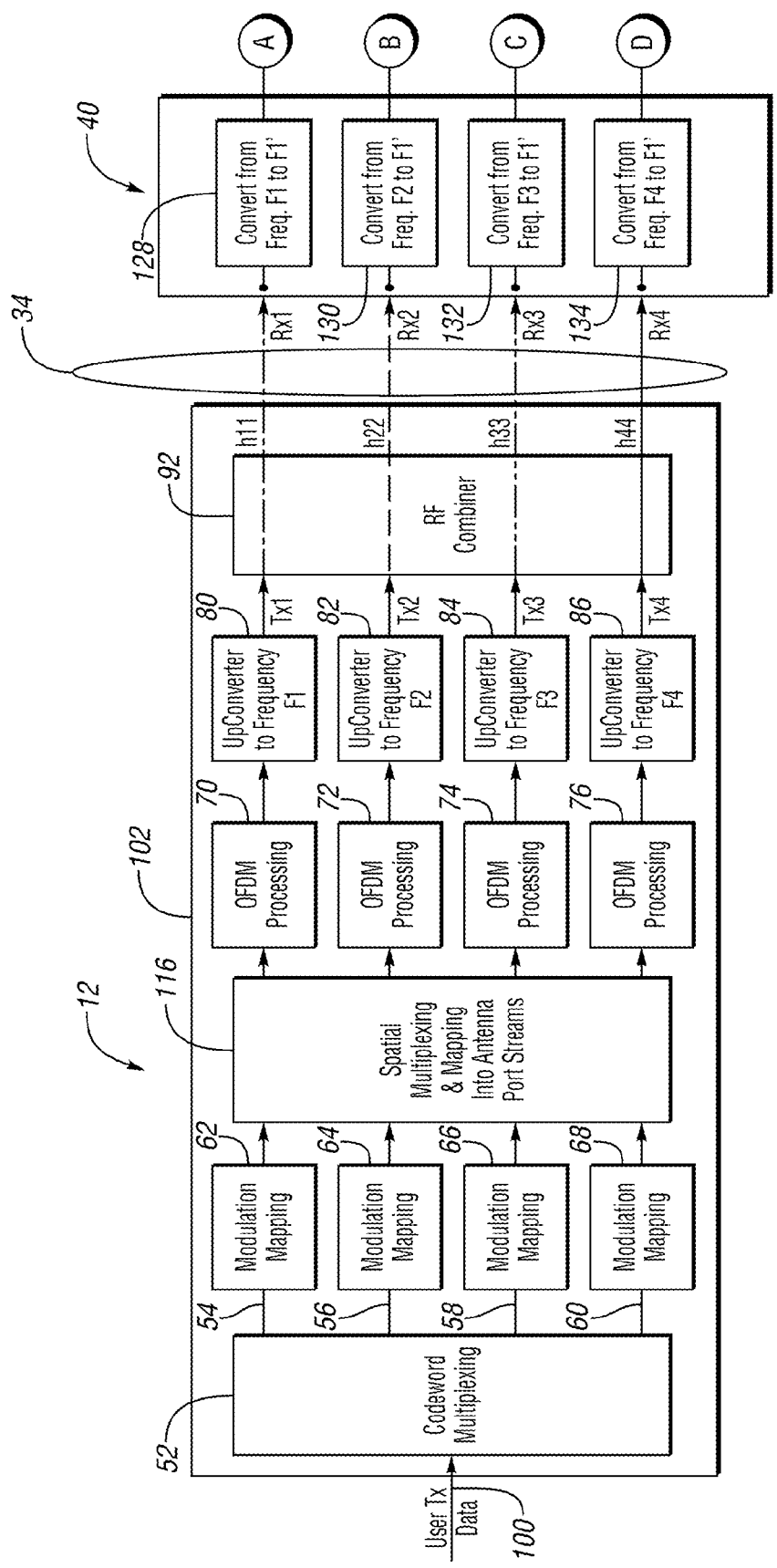
FIGS. 4a-4b schematically illustrate operation of the communication system when facilitating a wireless signaling mode in accordance with one non-limiting aspect of the present invention.
Figure 4B:
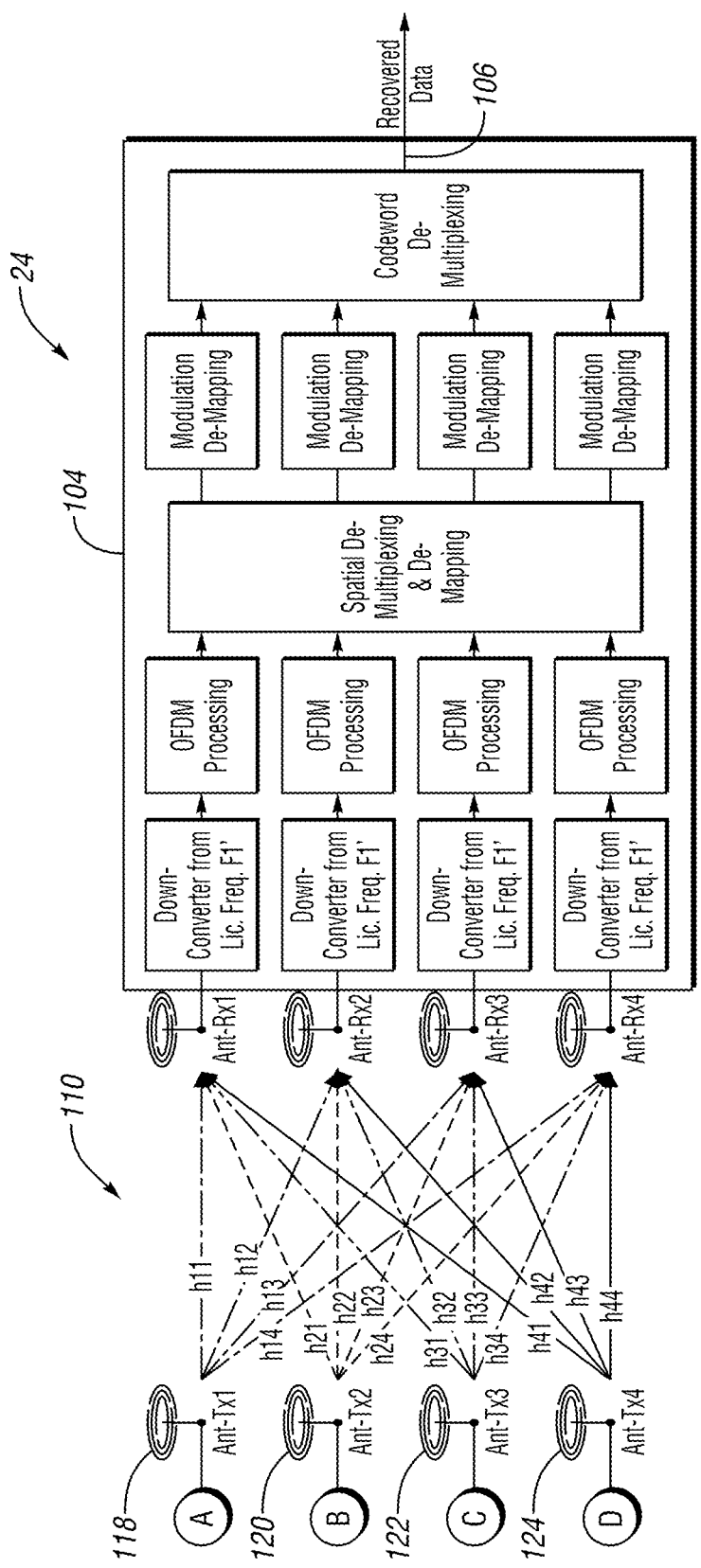

FIG. 4 schematically illustrates operation of the communication system 10 when facilitating a wireless signaling made in accordance with one non-limiting aspect of the present invention. The wireless signaling may be similar to the signaling described with respect to FIG. 3 in that an input signal 100 received at the first signal processor 12 is converted to an intermediary signal for transmission to a second signal processor 104 where it is then converted to an output signal 106. The illustration associated with FIG. 4 differs from that in FIG. 3 at least in that the intermediary signal traverses at least part of the distance between the first and second signal processors 12, 104 through a wireless medium 110. In particular, FIG. 4 illustrates a scenario where the intermediary signal is transmitted initially through the wireline communication medium 34 and thereafter through the wireless communication medium 110, which may correspond with a signal traveling from the headend unit 12 through the third end station 40 for wireless received at the second end station 24 (see FIG. 1).

The configuration shown in FIG. 4 may have many uses and applications, including supporting cellular telephone services, or other services that are at least partially dependent on wireless or RF signaling, where a cellular telephone service provider desires to obtain certain benefits associated with transporting signaling at least partially through the wireline communication medium 34. The ability to at least partially rely on the wireline communication medium 34 may be beneficial in facilitating long-haul transport for the corresponding signaling (intermediary signal) in a manner that maximizes throughput and minimizes interference or other signaling loss that may be experienced should the same signal be transmitted solely through wireless mediums 110. The third end station 40 may be included between the first and second end stations 12, 24 to facilitate interfacing the wireline communication medium 34 with the wireless communication medium 110. Optionally, the third end station 40 may be position as close to the second end station 24 as possible in order to maximize use of the wireline communication medium 34 and/or the third end station 40 may be included as part of the first end station 12 in order to maximize wireless communication.

The first and second signal processors 12, 104 shown in FIG. 4 may be configured similarly to the corresponding signal processors shown in FIG. 2. The elements illustrated in FIG. 4 with the same reference numerals, unless otherwise noted, may be configured to perform in the same manner as those described above with respect to FIG. 2. The first and second signal processors 12, 104 of FIG. 4 may include an additional device to facilitate supporting the at least partial wireless communication, which is referred to as a spatial multiplexing and mapping device 116 and its corresponding inverse. The spatial multiplexing device 116 may be configured to facilitate spatial diversity of the signal parts output from the modulation mapping devices. The spatial multiplexing and mapping device 116 may be configured to add delay to one or more of the signal parts 54, 56, 58, 60 in order to facilitate spatially separating each signal part 54, 56, 58, 60 from one another. This may be beneficial in order to enhance the spatial diversity of subsequent antennas 118, 120, 122, 124 being individually used to transmit the signal parts 54, 56, 58, 60.

The third end station 40 may be configured to receive the frequency diverse signaling output from the combiner 92. The third end station 40 may include converter devices 128, 130, 132, 134 or additional features sufficient to facilitate converting the received frequency diverse signaling to spatially diverse signaling. The third end station 40 may include one converter device 128, 130, 132, 134 for each of the received signal parts, i.e., a first converter 128 for the first signal part 54, a second converter 130 for the second signal part 56, a third converter 132 for the third signal part 58 and a fourth converter 134 for the fourth signal part 60. Each converter 128, 130, 132, 134 may be configured to convert the frequency of the received signal part to a common frequency. The common frequency may correspond with a frequency licensed by an originator of the input signal 100, e.g., wireless frequency ranges purchased by cell phone service providers and/or another frequency range otherwise designated to be sufficient to facilitate subsequent wireless transmission to the second end station 24. The second end station 24 may include a separate antenna for each of the active converter devices in order to facilitate spatially transmitting the signal parts to the second UE.

As supported above, the present invention contemplates a method to enable MIMO in any wireline environment. This may be done using techniques that un-correlate the data paths (such as frequency shifting), full orthogonality of the multiple data paths is ensured, and optimal capacity gain can be achieved. Furthermore, the proposed method allows the use of long term evolution (LTE) air interface stack to be implemented in any wireline environment with minimum modification.

The present invention contemplates leveraging the economies of scale of LTE chips which can potentially reach the order of billions in the near future. The wireline environment could benefit tremendously from the present invention as the wireline and wireless industries can become more synergistic using the same family of chips. The services can be more seamless as users traverses from wireless to wireline environment and vice versa. Limited spectrum in wireless environments can be supported by the wireline networks using the proposed techniques.

One non-limiting aspect the present invention may enable the HFC as a Distributed Antenna System (DAS) for LTE carriers and does it more effectively than the MNO really can by themselves and/or enable an HFC based broadband service to be based on LTE technology leveraging the much higher global economies of scale for chips, infrastructure, and even EPC and back office.

One benefit of the present invention may be in the increased SDM orthogonality enabled by the different antenna locations broadcasting the same wireless spectrum that increases the MiMo benefit over a single antenna point. This may be equally valuable since a significant amount of the cost of building a cell is in the civil infrastructure negotiating the antennas site, real estate deal, construction permits, etc. Another benefit of the present invention may be in that it may not increase bps or bps/Hz over what could be done with a DOCSIS solution, but it could potentially be delivered at lower cost due to the scale of the wireless industry, also creates a B2B play for hosting multi-tenant DAS leveraging existing HFC infrastructure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A multiple-input multiple-output (MIMO) signal processor comprising:
an input configured to receive an input signal desired for transmission, the input signal being non-diverse;
a multiplexer configured to multiplex the input signal into at least a first signal part, a second signal part, a third signal part and a fourth signal part;
a transmitter configured to transmit the first signal part at a first frequency, the second signal part at a second frequency, the third signal part at a third frequency and the fourth signal part at a fourth frequency, each of the first, second, third and fourth frequencies being diverse; and
wherein the multiplexer is configured to add parity information to each of the first, second, third and fourth signal parts prior to combining the first, second, third and fourth signal parts for transmission over a non-optical, wireline communication medium.

2. A multiple-input multiple-output (MIMO) communication system comprising:
a signal processor configured to:
i) receive an input signal desired for transmission, the input signal being non-diverse;
ii) multiplex the input signal into at least a first signal part, a second signal part, a third signal part and a fourth signal part;
iii) transmit the first signal part at a first frequency, the second signal part at a second frequency, the third signal part at a third frequency and the fourth signal part at a fourth frequency, each of the first, second, third and fourth frequencies being diverse; and
an end station configured to:
i) receive the first, second, third and fourth signal parts after being transmitted over a non-optical communication medium; and
ii) correlate the received first, second, third and fourth signal parts for spatially diverse radio frequency (RF) transmission.

3. The communication system of claim 2 wherein:
the spatially diverse RF transmission is characterized by the first, second, third and fourth signal parts being correlated such that each signal part is transmitted at a common frequency; and
the end station includes a converter configured to convert the first frequency of the first signal part to the common frequency, to convert the second frequency of the second signal part to the common frequency, to convert the third frequency of the third signal part to the common frequency and to convert the fourth frequency of the four signal part to the common frequency.

4. The communication system of claim 2 wherein:
the spatially diverse RF transmission is characterized by the first, second, third and fourth signal parts being correlated such that each signal part is transmitted at a common frequency;
the end station includes a first antenna, a second antenna, a third antenna and a fourth antenna to respectively transmit the first signal part, the second signal part, the third signal part and the fourth signal part, the first, second, third and fourth antennas being spatially diverse; and
a user device (UE) receiving the first, second, third and fourth signal parts from the first, second, third and fourth antennas, each of the first, second, third and fourth signal parts received at the UE corresponding with a different portion of the input signal when, the UE reconstructing the input signal from the received first, second, third and fourth signal parts.

5. A multiple-input multiple-output (MIMO) communication system comprising:
a signal processor configured to:
i) receive an input signal desired for transmission, the input signal being non-diverse;
ii) multiplex the input signal into at least a first signal part, a second signal part, a third signal part and a fourth signal part;
iii) transmit the first signal part at a first frequency, the second signal part at a second frequency, the third signal part at a third frequency and the fourth signal part at a fourth frequency, each of the first, second, third and fourth frequencies being diverse
iv) combine the first, second, third and fourth signal parts for transmission over at least one of a wireline communication medium and an optical communication medium; and
an end station configured to:
i) receive the first, second, third and fourth signal parts after being transmitted over the at least one of the wireline communication medium and the optical communication medium;
ii) correlate the first, second, third and fourth signal parts for spatially diverse radio frequency (RF) transmission, the spatially diverse RF transmission being characterized by the first, second, third and fourth signal parts being correlated such that each signal part is transmitted at a common frequency; and
iii) select the common frequency from a plurality of available frequencies, the plurality of available frequencies being selected according to an originator of the input signal such that the common frequency is selected from at least one of the available frequencies associated with the originator.

6. A multiple-input multiple-output (MIMO) signal processor comprising:
an input configured to receive an input signal desired for transmission, the input signal being non-diverse;
a multiplexer configured to multiplex the input signal into at least a first signal part, a second signal part, a third signal part and a fourth signal part;
a transmitter configured to transmit the first signal part at a first frequency, the second signal part at a second frequency, the third signal part at a third frequency and the fourth signal part at a fourth frequency, each of the first, second, third and fourth frequencies being diverse;
a combiner configured to combine the first, second, third and fourth signal parts for transmission over at least one of a wireline communication medium and an optical communication medium; and a delay configured to delay at least one of the first signal part, the second signal part, the third signal part and the fourth signal part prior to transmission over at least one of the wireline communication medium and the optical communication medium.

7. A multiple-input multiple-output (MIMO) communication system comprising:
a signal processor configured to:
i) receive an input signal desired for transmission, the input signal being non-diverse;
ii) multiplex the input signal into at least a first signal part, a second signal part, a third signal part and a fourth signal part;
iii) transmit the first signal part at a first frequency, the second signal part at a second frequency, the third signal part at a third frequency and the fourth signal part at a fourth frequency, each of the first, second, third and fourth frequencies being diverse; and
an end station configured to:
receive the first, second, third and fourth signal parts after being transmitted over a non-optical, wireline communication medium, each of the first, second, third and fourth signal parts corresponding with distinct portions of the input signal; and
process the first, second, third and fourth signal parts into an output signal representative of the input signal, the output signal being spatially and frequency non-diverse.

8. A method of facilitating signal transmissions comprising:
receiving an input signal desired for transmission;
multiplexing the input signal into at least a plurality of signal parts;
modulation mapping each of the plurality of signal parts after the multiplexing;
orthogonal frequency division multiplexing (OFDM) processing each of the plurality of signal parts after the modulation mapping;
transmitting each of the plurality of signal parts for long-haul transmission over at least one of a wireline communication medium and an optical communication medium after the OFDM processing, including transmitting each of the plurality of signal parts at a different center frequency; and
wherein the multiplexing includes adding parity information to each of the plurality of signal parts and the OFDM processing includes relating each of the plurality of signal parts to actual spectrum.

9. The method of claim 8 further comprising receiving the input signal in a frequency and spatially non-diverse state.

10. The method of claim 8 further comprising receiving the input signal in a digital state and wherein the modulation mapping includes mapping the digital state of the input signal to a constellation symbol.

11. A method of facilitating signal transmissions comprising:
receiving an input signal desired for transmission;
multiplexing the input signal into at least a plurality of signal parts;
modulation mapping each of the plurality of signal parts after the multiplexing;
orthogonal frequency division multiplexing (OFDM) processing each of the plurality of signal parts after the modulation mapping;
transmitting each of the plurality of signal parts for long-haul transmission over at least one of a wireline communication medium and an optical communication medium after the OFDM processing, including transmitting each of the plurality of signal parts at a different center frequency; and
spatially multiplexing each of the plurality of signal parts after the modulation mapping and before the OFDM processing, the spatially multiplexing including delaying at least one of the plurality of signal parts relative to another one of the plurality of signal parts.

12. A method of facilitating signal transmissions comprising:
receiving an input signal desired for transmission;
multiplexing the input signal into at least a plurality of signal parts;
modulation mapping each of the plurality of signal parts after the multiplexing;
orthogonal frequency division multiplexing (OFDM) processing each of the plurality of signal parts after the modulation mapping;
transmitting each of the plurality of signal parts for long-haul transmission over at least one of a wireline communication medium and an optical communication medium after the OFDM processing, including transmitting each of the plurality of signal parts at a different center frequency;
receiving each of the plurality of signal parts after being transmitted over the wireline communication medium in a spatially non-diverse manner;
correlating each of the plurality of signal parts after being transmitted over the wireline communication medium for spatially diverse radio frequency (RF) transmission at a common frequency; and
processing the RF transmission to generate an output signal approximating the input signal, the output signal being frequency non-diverse and including each of the plurality of signal parts.

13. A method of facilitating a cellular phone call between an originating device and a destination device, the method comprising:
receiving an input signal representative of at least part of the cellular phone call;
multiplexing the input signal into at least a plurality of signal parts;
transmitting each of the plurality of signal parts for long-haul transmission over at least one of a wireline communication medium and a fiber optic communication medium, including transmitting each of the plurality of signal parts at a different center frequency;
receiving each of the plurality of signal parts after being transmitted over the at least one of the wireline communication medium and the fiber optic communication medium;
correlating each of the plurality of signal parts for spatially diverse radio frequency (RF) transmission to the destination device, including transmitting each of the plurality of signal parts at a common frequency;
identifying a service provider associated with the destination device; and
selecting the common frequency based on the identity of the service provider.

14. A multiple-input multiple-output (MIMO) communication signal processor comprising:
an input configured to receive an input signal desired for transmission, the input signal being non-diverse;
a multiplexer configured to multiplex the input signal into at least a first signal part, a second signal part, a third signal part and a fourth signal part;

a transmitter configured to transmit the first signal part at a first frequency, the second signal part at a second frequency, the third signal part at a third frequency and the fourth signal part at a fourth frequency, each of the first, second, third and fourth frequencies being diverse;

wherein the input signal is spatially non-diverse and frequency non-diverse;

wherein the first, second, third and fourth parts are multiplexed to each include a different portion of the input signal; and wherein the first, second, third and fourth parts are transmitted in a non-spatially diverse manner to a coaxial cable medium for transport to an end station.

15. The MIMO communication signal processor of claim 14 further configured to receive the input signal from a cellular communication system, the input signal being derived from a cellular signal transmitted over the cellular communication system;

receive the input signal from an Internet Service Provider (ISP), the input signal being derived from data transmitted through the ISP; and receive the input signal from a cable television service provider system, the input signal being derived from television transmissions carried over the cable television service provider system.

16. A method of facilitating signal transmissions comprising:

receiving an input signal desired for transmission;

multiplexing the input signal into at least a plurality of signal parts;

modulation mapping each of the plurality of signal parts after the multiplexing;

orthogonal frequency division multiplexing (OFDM) processing each of the plurality of signal parts after the modulation mapping;

transmitting each of the plurality of signal parts for long-haul transmission over at least one of a wireline communication medium and an optical communication medium after the OFDM processing, including transmitting each of the plurality of signal parts at a different center frequency; and transmitting each of the plurality of signal parts for long-haul transmission over the wireline communication medium, including transmitting each of the plurality of signal parts without spatial diversity and such that each of the plurality of signal parts includes a different portion of the input signal.

17. A method of facilitating a cellular phone call between an originating device and a destination device, the method comprising:

receiving an input signal representative of at least part of the cellular phone call;

multiplexing the input signal into at least a plurality of signal parts, wherein each signal part includes a different portion of the input signal;

transmitting each of the plurality of signal parts for long-haul transmission over at least one of a wireline communication medium and a fiber optic communication medium without spatial diversity, including transmitting each of the plurality of signal parts at a different center frequency;

receiving each of the plurality of signal parts after being transmitted over the at least one of the wireline communication medium and the fiber optic communication medium;

correlating each of the plurality of signal parts for spatially diverse radio frequency (RF) transmission to the destination device, including transmitting each of the plurality of signal parts at a common frequency.

* * * * *